United States Patent
Lindoff et al.

(10) Patent No.: US 6,370,205 B1
(45) Date of Patent: Apr. 9, 2002

(54) METHOD AND APPARATUS FOR PERFORMING DC-OFFSET COMPENSATION IN A RADIO RECEIVER

(75) Inventors: Bengt Lindoff, Lund; Sven Erik Niklas Stenström, Helsingborg; Nils Kullendorf, Bjärred, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/347,020

(22) Filed: Jul. 2, 1999

(51) Int. Cl.[7] .............................................. H04L 25/06
(52) U.S. Cl. ....................... 375/319; 375/342; 375/346; 375/350; 370/527; 370/529; 455/304; 455/305; 329/320
(58) Field of Search ................................. 375/319, 317, 375/340, 341, 342, 346, 350, 231, 232, 260, 262; 370/314, 336, 337, 345, 347, 350, 442, 529, 527, 498; 455/304, 305, 310, 311, 296; 329/320, 349, 353

(56) References Cited

U.S. PATENT DOCUMENTS

| | | | | |
|---|---|---|---|---|
| 4,873,702 A | | 10/1989 | Chiu ........................... 375/76 |
| 4,887,050 A | * | 12/1989 | Borth et al. ................. 329/318 |
| 5,241,702 A | * | 8/1993 | Dent ........................... 329/325 |
| 5,319,679 A | | 6/1994 | Bagby ......................... 375/106 |
| 5,442,655 A | | 8/1995 | Dedic et al. ................ 375/340 |
| 5,724,653 A | * | 3/1998 | Baker et al. ................. 375/319 |
| 5,748,681 A | * | 5/1998 | Comino et al. ............. 327/307 |
| 5,754,595 A | | 5/1998 | Honkasalo ................... 375/286 |
| 6,311,051 B1 | * | 10/2001 | Jung ........................... 375/319 |
| 6,327,315 B1 | * | 12/2001 | Piirainen .................... 370/347 |
| 6,337,855 B1 | * | 1/2002 | Malkamaki ................. 370/347 |

FOREIGN PATENT DOCUMENTS

| | | |
|---|---|---|
| EP | 0 474 615 A2 | 3/1992 |
| GB | 2267629 A | 12/1993 |
| JP | 1-173912 | 7/1989 |
| JP | 4-103222 | 4/1992 |
| JP | 6-085865 | 3/1994 |
| JP | 7-297869 | 11/1995 |
| JP | 8-237317 | 9/1996 |
| JP | 9-331257 | 12/1997 |
| JP | 10-164163 | 6/1998 |
| WO | WO98/25351 | 6/1998 |

OTHER PUBLICATIONS

Yushi Shirato, et al., "40 Mbit/s Adaptive MLSE Equalizer LSI and its Performance in 5GHz–Band Transmission System," 1999 49th Vehicular Technology Conference (Cat. No. 99CH36363), 1999 IEEE 49th Vehicular Technology Conference. Moving into a New Millenium, Houston, TX, USA, May 16–20, 1999, pp. 305–308, vol. 1, XP002133307.

* cited by examiner

Primary Examiner—Chi Pham
Assistant Examiner—Khanhcong Tran
(74) Attorney, Agent, or Firm—Burns, Doane, Swecker & Mathis, L.L.P.

(57) ABSTRACT

In order to increase accuracy of DC-offset compensation within radio receivers and to ensure that such compensation does not erode the dynamics of the decoders located within the receivers, the present invention separately performs mean value estimation and channel estimation. Additionally, a bias DC offset value caused by the use of a training sequence to perform mean value estimation can be corrected for in the channel estimator and equalizer.

20 Claims, 5 Drawing Sheets

METHOD AND APPARATUS FOR PERFORMING DC-OFFSET COMPENSATION IN A RADIO RECEIVER

BACKGROUND

The present invention generally relates to a method and apparatus for compensating for DC-offset when receiving signals in a radio receiver. More specifically, the present invention proposes a method and apparatus for compensating for DC-offset introduced in the radio receiver in such a way that the DC-offset estimation and channel estimation are separated, and that any bias in the DC-offset estimation due to the transmitted symbols is compensated for in a channel estimator and in an equalizer.

In digital communications systems, transmission signals are produced by the modulation of a carrier signal with digital data to be transmitted. The digital data is commonly transmitted in bursts where each burst consists of a number of data bits. When the transmitted signal is received, the signal requires demodulation in order to recover the data.

Radio receiver architectures commonly employ direct conversion (i.e., homodyne) receivers to perform the demodulation of a received signal. A local oscillator operating at the carrier frequency is used to mix down the received signal to produce in-phase (I) and quadrature (Q) baseband signals. Direct conversion receivers are very efficient in terms of both cost and current consumption. The motivation behind the direct conversion receiver is to have the incoming carrier directly converted down to baseband, in both I and Q components, without use of any IF frequencies. However, direct conversion receivers also have drawbacks. For example, a DC-offset can be introduced to the DC level of received signal. A DC-offset arises from mainly three sources: (1) transistor mismatch in the signal path, (2) local oscillator signal leaking and self-downconverting to DC through the mixer, and (3) a large near-channel interferer leaking into the local oscillator and self-downconverting to DC. As a result, a signal that is received from a transmitter can be farther distorted, and thereby lead to inaccurate data decoding. Additionally, the DC-offset can be several decibels (dB) larger than the information signal, requiring the DC-offset to be compensated for in order to be able to recover the transmitted data in the decoder.

The simple and most immediate way to compensate for the DC-offset is to estimate the mean value of the received burst, subtract the estimate from the received signal and then feed the signal to the decoder. However, the estimate introduces a bias DC offset, due to the finite amount of data used for estimating the DC-offset. The bias DC offset can be so large that the bit error rate of the receiver does not decrease as the signal-to-noise ratio increases. As a result, the bias DC offset will determine the minimum amount of noise (i.e., the noise floor) that is combined with the data within the receiver.

Furthermore, since the transmitted data is unknown, it is impossible to compensate for the bias DC offset in the signal before it is supplied to the decoder unless a large amount of data is received (in which the bias DC offset will be reduced to zero) or both the transmitted symbols and the channel are known. A way to overcome this problem is to compensate the DC level in the decoder. However, while this solves the bias DC offset problem, the dynamics in the decoder will be too large because the DC-offset level can be several decibels (dB) larger than the received signal. Also, numerical problems are encountered when estimating the radio channel and the DC-offset simultaneously because of the magnitude difference between the channel parameters and the DC component. Therefore, there is a need for methods and apparatuses that separate the mean value estimation and channel estimation tasks and that also compensate for the bias DC offset introduced by the transmitted sequence.

SUMMARY

To remedy the problems encountered in conventional DC-offset compensation techniques, the present invention provides the ability to separate mean value estimation and channel estimation and the ability to compensate for bias DC offset introduced by the transmitted sequence.

In accordance with an exemplary embodiment of the present invention methods and apparatuses are disclosed that can compensate for DC-offset in a receiver by receiving a transmitted signal burst at the receiver; downconverting the signal burst into a set of baseband component values; finding a known training sequence in the set of baseband component values; estimating a DC-offset value using the known training sequence; subtracting the DC-offset value from the set of baseband component values to obtain a second set of baseband component values; performing channel estimation using the set of second baseband component values and outputting a channel model and a bias DC offset value, and performing equalization of the second set of baseband component values using the second set of baseband signals, the estimated channel model and the bias DC offset value.

Additionally, in accordance with another exemplary embodiment of the present invention methods and apparatuses are disclosed that can compensate for DC-offset in a receiver where the received DC level is not constant, by determining the location of at least one DC step value within the received signal and performing DC estimation based upon the known training sequence and the location of the at least DC step value one step value.

DRAWINGS

These and other features, objects and advantages associated with the present invention will be more readily understood upon reading the following detailed description, in conjunction with the drawings in which like reference numerals refer to like elements and where.

DETAILED DESCRIPTION

The present invention will now be described with reference to the accompanying drawings, in which various exemplary embodiments of the invention are shown. However, this invention may be embodied in many different forms and should not be construed as limited to the specific embodiments shown. For example, while the present invention is described in a time division multiple access (TDMA) environment utilizing homodyne receivers, it could also be employed in other access environments and with other types of receivers where any type of channel estimator and equalization method can be used in digital communication.

Figure 1:
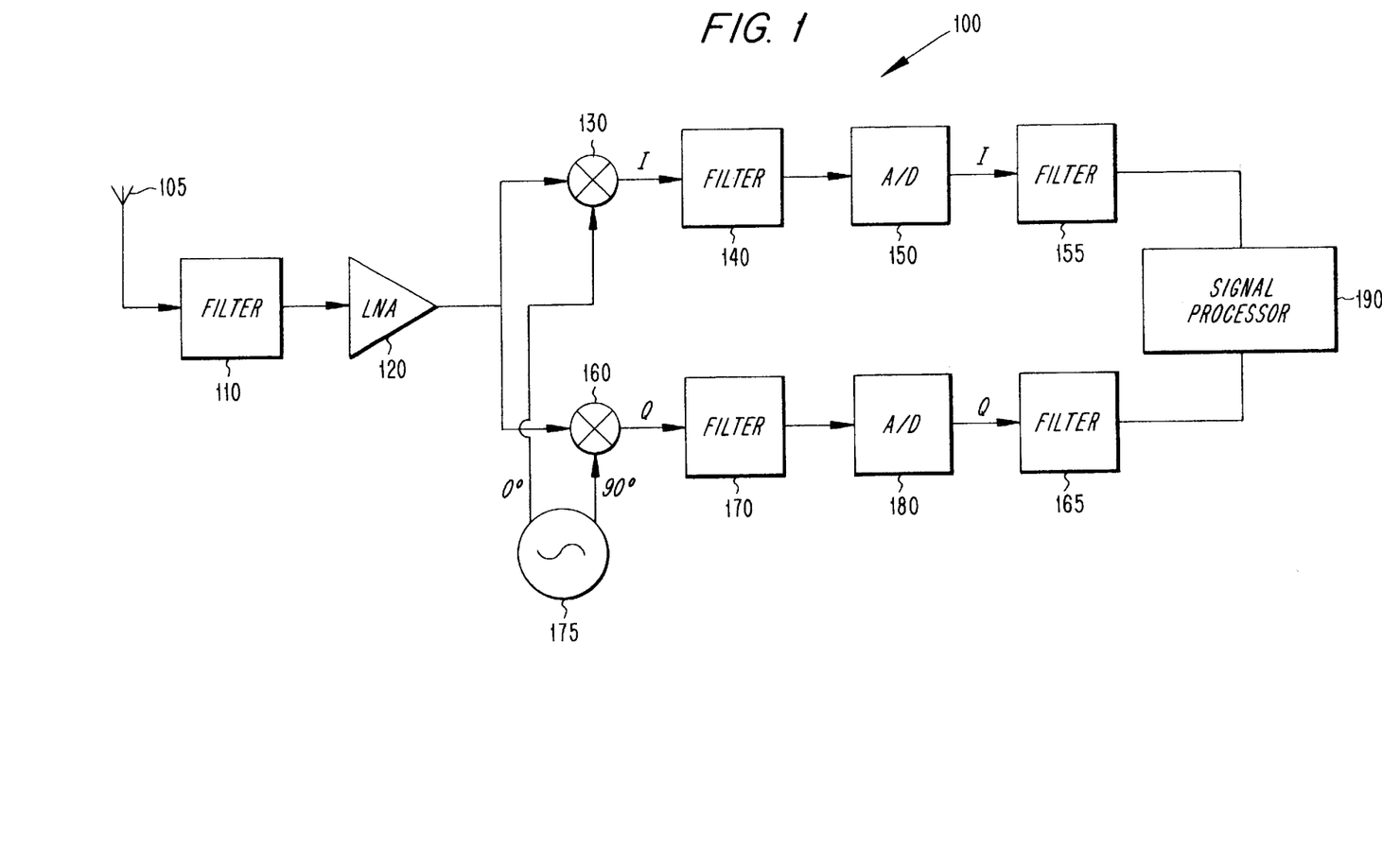
FIG. 1 is a schematic diagram of a homodyne receiver which can be employed within cellular communications systems.

FIG. 1 depicts a conventional homodyne receiver 100 which can be employed within mobile communication systems to receive data bursts. As illustrated in FIG. 1, antenna 105 receives a burst of data and sends the received burst to first filter 110. The first filter 110 can be a bandpass filter which is designed to pass only the desired frequency band (for example, the GSM frequency band). Once filtered, the signal is sent to a first amplifier 120. The first amplifier can be a low noise amplifier. The signal is then down converted to baseband in-phase (I) and quadrature phase (Q) signals by means of respective first and second mixers 130 and 160. The first and second mixers 130 and 160 are each controlled by a local oscillator 175. A first output of the local oscillator 175 is coupled to an output of the first mixer 130, and a second output of the local oscillator 175, having the same frequency and 90 degrees out of phase with the first output, is coupled to the second mixer 160. The local oscillator 175 is set to the carrier frequency of the wanted signal.

The signals output from the first and second mixers 130 and 160 are sent to filters 140 and 170, respectively. Filters 140 and 170 can be low pass filters which are employed in order to remove transient signals from the baseband I and Q signals. The filtered in-phase and quadrature signals are digitized by A/D converters 150 and 180, respectively. Outputs of the analog-to-digital converters 150 and 180 are next sent to respective filters 155 and 165. The output of filters 155 and 165 are sent to a signal processor 190 for signal processing and recovery of the transmitted information.

Figure 2:
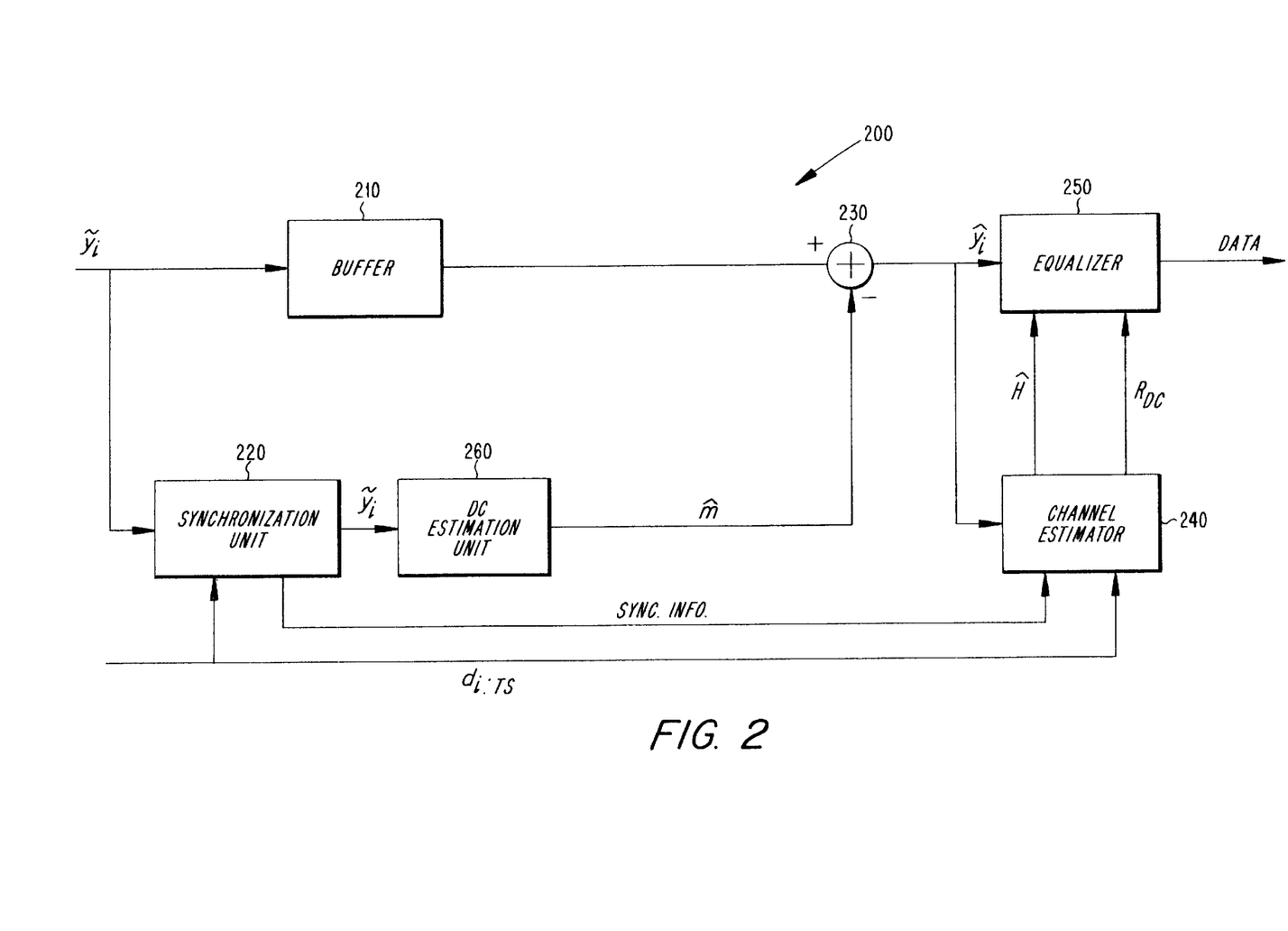
FIG. 2 is a block diagram of a DC-offset compensation device in accordance with an exemplary embodiment of the present invention.

FIG. 2 shows a block diagram of a DC-offset compensation apparatus 200 in accordance with an exemplary embodiment of the present invention. The DC-offset compensation apparatus 200 is located in the signal processor 190 of FIG. 1, and is employed to compensate for DC-offset introduced by the receiver.

The input baseband signal at time i, $\tilde{y}_i$, which consists of B data in a burst can be written as follows:

$$\tilde{y}_i = y_i + m, i = 1, 2, \ldots, B, \quad (1)$$

where $y_i$ is the desired information sequence, $I_i + jQ_i$, and m is the unknown DC-offset. The information sequence at time i can be written as follows:

$$y_i = H^T U + e_i, i = 1, 2, \ldots, B, \quad (2)$$

where $H = [h_0, h_1, \ldots, h_L]^T$ is a L+1 tap radio channel model, $U = [d_i, d_{i-1}, \ldots, d_{i-1}]$ is a vector of transmitted symbols, and $e_i$ represents noise. The received signal $\tilde{y}$ is stored in buffer 210, where the in-phase and quadratire quantities can be stored separately. The received signal $\tilde{y}$ is also sent to a synchronization unit 220. Synchronization information can be determined by correlating the received data stream to a training sequence, $d_{i:TS}$, known to be included in the burst. In determining synchronization information, the synchronization unit 220 finds the best match between the training sequence and the received signal and determines the position of the received samples in the burst that represent the training sequence.

In addition to determining synchronization information for later use by a of channel estimator, the synchronization unit 260 sends the received values to a DC estimation unit 260. At the DC estimation unit 260, an estimation of $\hat{m}$ is performed by using the received data determined to be the training sequence located in the received data generated by the training sequence, i.e., the estimate $\hat{m}$ in is generated according to $$\hat{m} = \frac{1}{N} \sum_{j=1}^{N} \tilde{y}_{j:TS}, \quad (3)$$

where, $\tilde{Y}_{j:TS}$ is the j:th received signal generated by the pilot symbols (assuming there are N+L pilot symbols in each burst). In other words, the estimate of the DC-offset is performed by using N pilot symbols from the training sequence in the burst. By expanding $\hat{m}$, the estimate can be written as follows:

$$\hat{m} = \frac{1}{N} \sum_{j=1}^{N} \tilde{y}_{j:TS} \quad (4)$$

$$= \frac{1}{N} \sum_{j=1}^{N} y_{j:TS} + m$$

$$= m + \frac{1}{N} \sum_{j=1}^{N} (H^T U_{j:TS} + e_{j:TS}),$$

where $U_{j:TS} = [(d_{j:TS}, \ldots, d_{j-L:TS}]^T$ is the j:th vector of length L+1 which only consists of pilot symbols $d_{j:TS}$, (i.e., known data).

As discussed above, a bias DC offset value is introduced by modulation and this value adds to the estimate of $\hat{m}$. The bias DC offset value is determined as follows:

$$R_{DC} = \frac{1}{N} \sum_{j=1}^{N} H^T U_{j:TS} = H^T \overline{U}_{TS}. \quad (5)$$

The bias DC offset value, $R_{DC}$, can not yet be computed since the channel H is still unknown. However, $\overline{U}_{TS}$ is known since it is based upon the known training sequence. By subtracting the estimated mean value determined in the DC-offset estimation unit 260 from the received input sequence stored in buffer 210 at adder 230, the following result is obtained:

$$\hat{y}_i = \tilde{y}_i - \hat{m} = y_i - H^T \overline{U}_{TS} - \frac{1}{N} \sum_{j=1}^{N} e_{j_{TS}}, \quad (6)$$

$$= H^T U_i + e_i - H^T \overline{U}_{TS} - \overline{e}_{TS}, i = 1, \ldots, B.$$

The signal $\hat{y}_i$ together with synchronization information determined in the synchronization unit 220 are fed to a channel estimator 240 where $\hat{y}_{j:TS}$, j=1, . . . , N is used for estimating the channel and $\hat{y}_{j:TS}$ can be written as follows:

$$\hat{y}_{j:TS} = H^T U_{j:TS} + e_j - H^T \overline{U}_{TS} - \overline{e}_{TS} \quad (7)$$

$$= H^T (U_{j:TS} - \overline{U}_{TS}) + e_j - \overline{e}_{TS}, j = 1, \ldots, N.$$

As can be seen from equation (7), it is possible to use the following model in the channel estimator:

$$\hat{y}j:TS = H^T(U_{j:TS} - \overline{U}_{j:TS}). \quad (8)$$

The difference between the model used in the channel estimator 240 in accordance with an exemplary embodiment of the present invention and the classical channel model, is that the input sequence $U_{j:TS} - \overline{U}_{j:TS}$ is used instead of $U_{j:TS}$, as thereby compensating for the bias DC offset introduced by the modulation. Furthermore, note that this will be the best compensation able to be performed since in the noise free case (i.e., $\text{Var}(e_i)=0$) equations (7) and (8) are perfectly matched, thereby indicating that $\hat{H} \rightarrow H$ when $\text{Var}(e_i) \rightarrow 0$. Thus, in the noise free case perfect channel estimates can be obtained.

The channel estimate $\hat{H}$ obtained in the channel estimator 240 is then fed into an equalizer 250. The equalizer can be of any type, for example, an MLSE equalizer. An MLSE equalizer hypothesizes a received signal for all possible transmitted data sequences and after comparing each of these with the actually received signal, chooses the hypothesized data sequence with the maximum probability of being transmitted. The metric used in the equalizer includes the term $\hat{R}_{DC} = \hat{H}^T \overline{U}_{TS}$. The metric to be minimized is $$l = \sum_{k=1}^{N} (\hat{y}_k + \hat{R}_{DC} - \hat{H}^T U_k)^2. \tag{9}$$

where N is the number of information symbols in the burst. As can be seen from (7) and (9), by including the extra term $\hat{R}_{DC} = \hat{H}^T \overline{U}_{TS}$ as shown in equation (9), the metric used in the equalizer 250 will be the same as the metric commonly used in classical MLSE equalizers for signals with no DC component. Thus, by using the channel estimator 240 and equalizer 250 presented above, the DC-offset component will not determine the minimum amount of noise (i.e., the noise floor) in the receiver.

Figure 3:
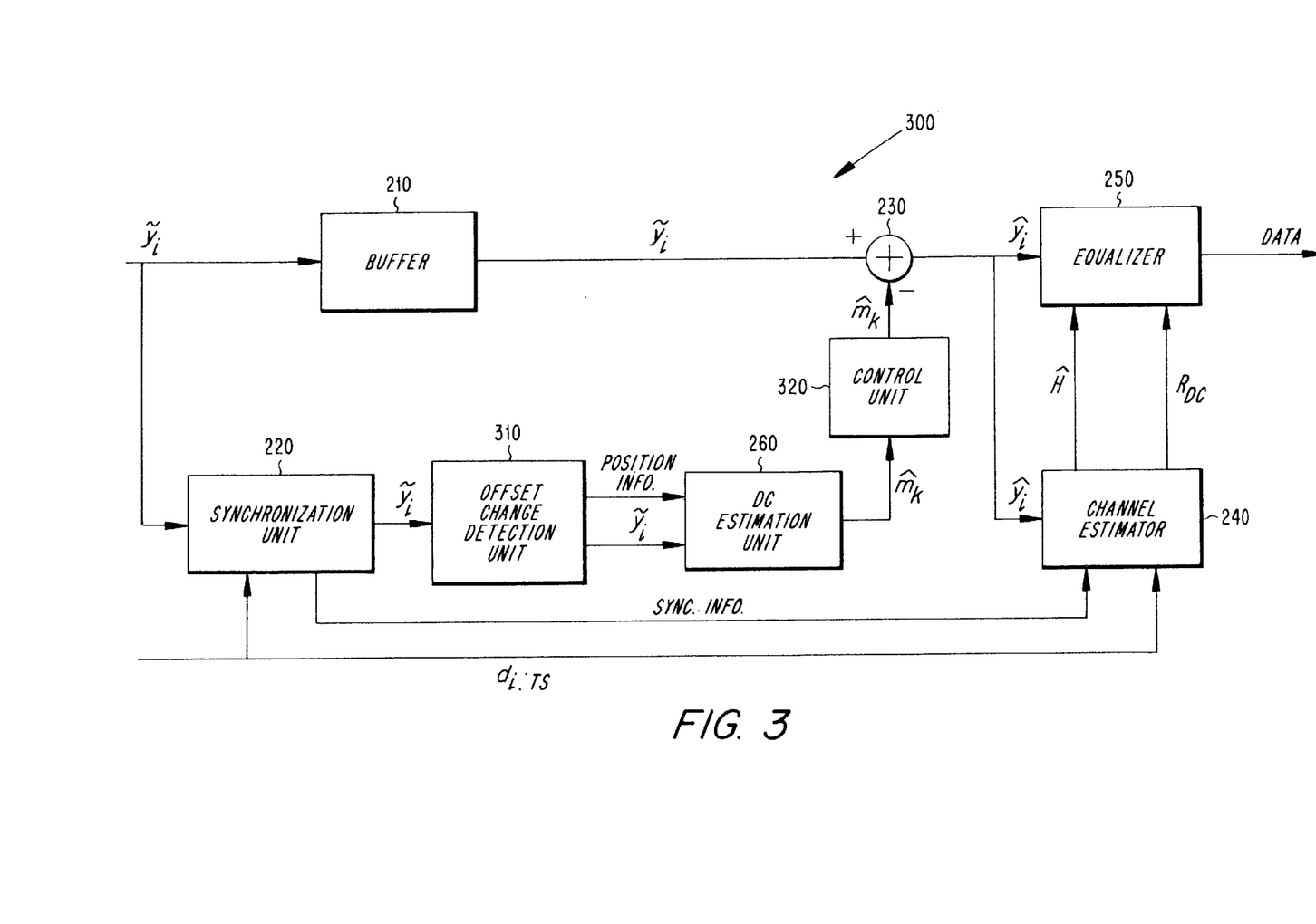
FIG. 3 is a block diagram of a DC-offset compensation device to account for changing DC-offsets in accordance with an exemplary embodiment of the present invention.

In accordance with another exemplary embodiment of the present invention, compensation can be performed to accommodate for magnitude changes (a DC step) in the DC level of a received signal. A DC step can occur in a received signal when, for example, a strong nearby interferer ramps up its output signal. In the DC offset compensation apparatus 300 illustrated in FIG. 3, the baseband signal of a received burst is stored in buffer 210 and also is sent to a synchronization unit 220. The synchronization unit 220 locates the training sequence within the received data burst and supplies this synchronization information to the channel estimator 240. The data sequence values are fed to an offset change detection unit 310. The change detection unit 310 determines where changes in the DC-offset have occurred within a received burst of data.

Figure 4:
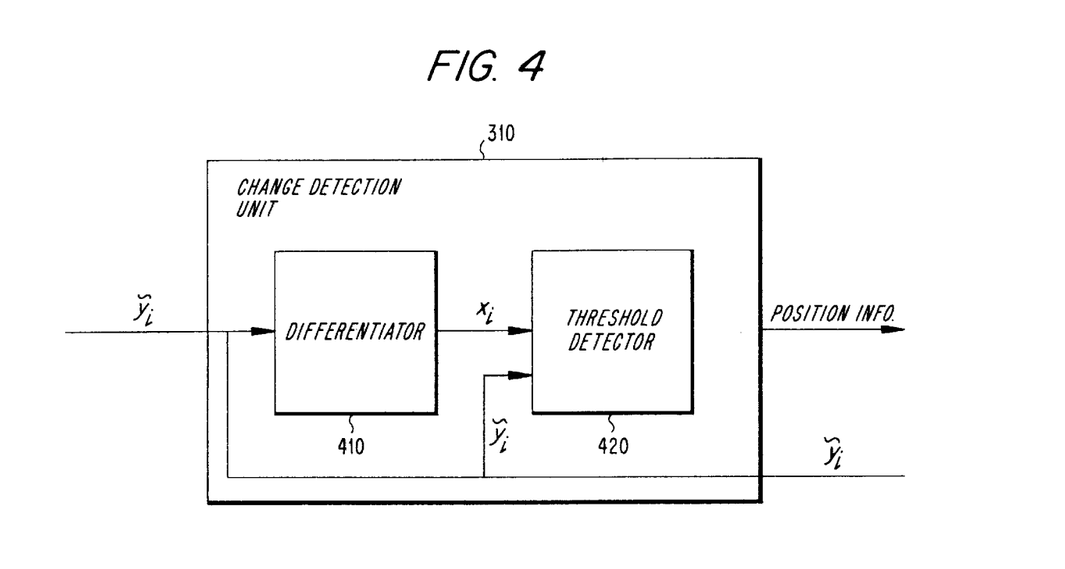
FIG. 4 is a block diagram of a offset change detection unit in accordance with an exemplary embodiment of the present invention.

As illustrated in FIG. 4, the offset change detection unit 310 may comprise, for example, a differentiator 410 and a threshold detector 420. The differentiator 410 and threshold detector 420 work in tandem to determine any step change in the DC level of the received data burst. The differentiator 410 differentiates the received signal (e.g., let $x_i = \hat{y}_i - \hat{y}_i - 1$.). Next, the threshold detector 420 determines if $|x|/\text{Pow}(\hat{y}_i) > \alpha$, where $\text{Pow}(\hat{y}_i)$ is the estimated power of $y_i$, and $\alpha$ is a predefined threshold. The estimated power is determined in the threshold detector 420. The predefined threshold is a peak voltage value chosen based upon the particular application. If, for example, the receiver requires high accuracy for an application, the threshold will be small. If $|x_i|/\text{Pow}(\hat{y}_i)$ is greater than $\alpha$, then a DC step is determined to have occurred at position i. Alternatively, the signal $x_i$ can be low pass filtered rather than being differentiated by a differentiator, before being compared to the predetermined threshold.

Referring back now to FIG. 3, the received sequence, $y_i$, together with position information (i.e., the time instants where DC steps are found) are both fed to the DC offset estimator 260 that estimates (n+1) DC offsets, $\hat{m}_k$ (where n is the number of detected DC changes in the burst). The estimated DC offsets $\hat{m}_k$, where k=1, ..., n+1, are fed to a control unit 320. The control unit 320 ensures that the DC offset estimates are subtracted from the received burst, $y_i$, in synchronism.

Figure 5A:
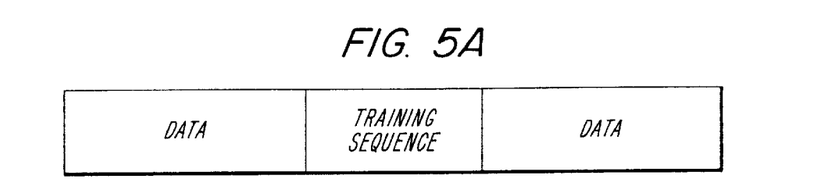
FIGS. 5A, 5B and 5C are diagrams of a typical TDMA burst, and DC steps that occur during a data sequence and during a training sequence of a typical TDMA burst in accordance with an exemplary embodiment of the present invention.
Figure 5B:
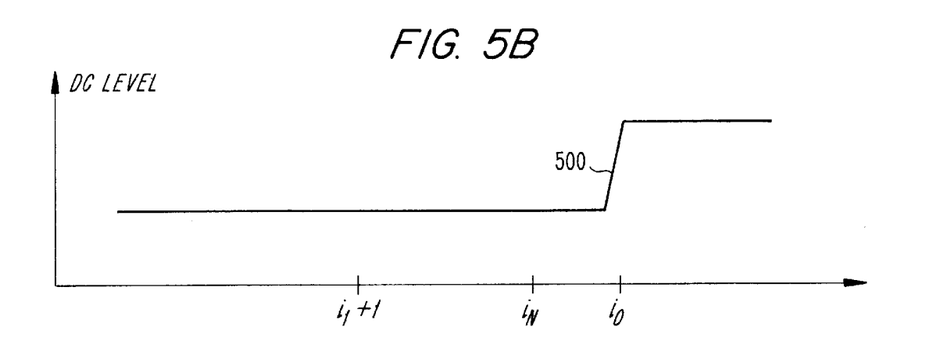

FIG. 5A illustrates a typical burst of data containing a training sequence surrounded by transmitted data. If at least one DC step does not occur during the received burst or during a transmitted training sequence, the DC offset is estimated in the manner described above with respect to FIG. 2. If, however, a DC step 500 occurs over a data sequence in a burst as illustrated in FIG. 5B (when compared to FIG. 5A), a rough compensation is performed. For the signal to the left of the DC step 500, compensation is performed in the manner described above with respect to FIG. 2. However, in order to compensate for the DC offset to the right of the DC step 500 in FIG. 5B the DC offset is estimated, as follows:

$$\hat{m}_2 = \frac{1}{B - i_0 + 1} \sum_{k=i_0}^{B} \tilde{y}_k \tag{10}$$

where B is the number of bits in the burst. The DC offset estimation is then subtracted from the received signal as follows $$\hat{y}_i = \hat{y}_i - \hat{m}_2, \, i = i_0, \ldots, B. \tag{11}$$

This calculation will result in an uncompensated bias DC offset for this part of the received signal because no known signals (i.e. training sequence) can be used when estimating.

Figure 5C:
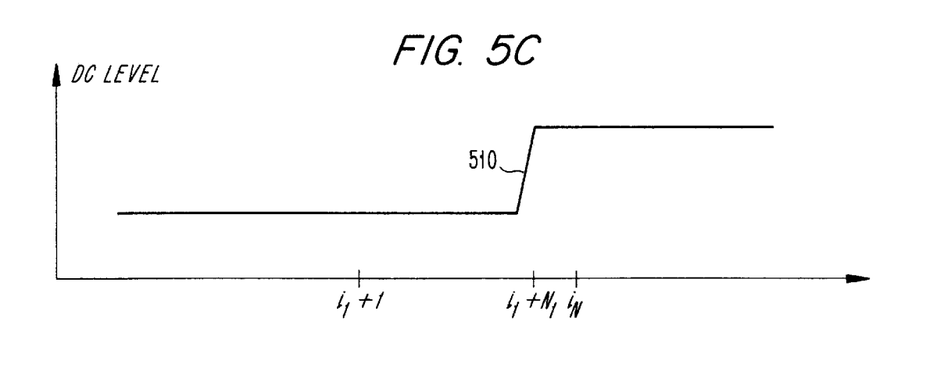

In another example as illustrated in FIG. 5C, if a DC step occurs somewhere within the training sequence, the DC offset to the left of the DC step 510 is estimated according to the following equation:

$$\hat{m}_1 = \frac{1}{N_1 - 1} \sum_{k=1}^{N_1 - 1} y_{k:TS} \tag{12}$$

where $N_1$ is the point in the data where the DC step occurs. The DC level to the right of the DC step 510 is estimated according to the following equation:

$$\hat{m}_2 = \frac{1}{N - N_1 + 1} \sum_{k=N_1}^{N} y_{k:TS} \tag{13}$$

where N is end of the training sequence of the burst. Thus, each half burst is treated independently and a correction value is determined in the same way as described above for each half burst ($\hat{m}_1$, $\hat{m}_2$), and subtracted, and the residual DC for each burst is compensated for in the channel estimator 240 and equalizer 250.

In this case the model used in the channel estimator 240 is as follows:

$$\hat{y}_{j:TS} = H^T (U_{j:TS} - \overline{U}_{j:TS}), \, j=1, \ldots, N \tag{14}$$

where $\overline{U}_{j:TS} = \overline{U}_{1:N_1-1,TS}$, J=1, is the mean value vector of the training sequence from time 1 to $N_1 - 1$ and $\overline{U}_{j:TS} = \overline{U}_{N_1:N,TS}$, $j=N_1, \ldots, N$ is the mean value vector of the training sequence from time $N_1$ to N.

While the present invention has been described with respect to its preferred embodiment, those skilled in the art will recognize that the present invention is not limited to the specific embodiment described and illustrated herein. Different embodiments and adaptations besides those shown herein and described as well as many variations, modifications and equivalent arrangements will now be apparent or will be reasonably suggested by the foregoing specification and drawings without departing from the substance of the scope of the invention.

What is claimed is:

1. A method for compensating for DC-offset in a receiver comprising the steps of:

receiving a transmitted signal burst at said receiver;

downconverting said signal burst into a set of baseband component values;

finding a known training sequence in the set of baseband component values;

estimating a DC-offset value using said known training sequence;

subtracting said DC-offset value from said from said set of baseband component values to obtain a second set of baseband component values;

performing channel estimation using said set of second baseband component values and outputting a channel model and a bias DC offset value, and performing equalization of said second set of baseband component values using said second set of baseband signals, said estimated channel model and said bias DC offset value.

2. The method of claim 1, wherein said first set of baseband component values are digitized signals.

3. The method of claim 1, wherein said set of baseband component values are in-phase and quadrature components of said received signal.

4. The method of claim 1, wherein said known training sequence comprises L+N pilot values, and said DC offset value estimation is performed according to the following equation:

$$\hat{m} = \frac{1}{N} \sum_{j=1}^{N} \tilde{y}_{j:TS}$$

where, $\tilde{y}_{j:TS}$ is a j:th vector of L+1 of the pilot symbols.

5. The method of claim 1, wherein said bias DC offset value is determined according to the following equation:

$$R_{DC} = \frac{1}{N} \sum_{j=1}^{N} H^T U_{j:TS} = H^T \overline{U}_{TS}$$

where H is a channel model and U is a reference training sequence.

6. The method of claim 1, after said finding step, further comprising the step of:

determining the location of at least one DC step value within said received baseband signal.

7. The method of claim 6, wherein said determining step further comprises:

differentiating said baseband component values; and determining whether said differentiated baseband component values exceed a predetermined threshold value.

8. The method of claim 6, wherein said subtracting step further comprises:

controlling the subtraction of said DC offset estimates from said received signal to ensure data synchronism between the estimated DC offset values and said set of baseband components.

9. The method of claim 6, wherein if said DC step occurs within a training sequence of said transmitted sequence, the estimating step is performed independently over a part of the received message affected by said DC step and over a part of the message not affected by the DC step.

10. The method of claim 6, wherein if said DC step does not occur over a training sequence of said received burst, said DC offset value estimation over the DC step is performed according to the following equation:

$$\hat{m}_2 = \frac{1}{B - i_0 + 1} \sum_{k=i_0}^{B} \tilde{y}_k$$

where B is the amount of data and $i_0$ is the time of determined DC step.

11. An apparatus for compensating for DC-offset in a receiver comprising:

means for receiving a transmitted signal burst at said receiver;

means for downconverting said signal burst into a set of baseband component values;

means for locating a known training sequence in the set of baseband component values;

means for estimating a DC-offset value using said known training sequence;

means for subtracting said DC-offset value from said from said set of baseband component values to obtain a second set of baseband component values;

means for performing channel estimation using said set of second baseband component values and outputting a channel model and a bias DC offset value, and means for performing equalization of said second set of baseband component values using said second set of baseband signals, said estimated channel model and said bias DC offset value.

12. The apparatus of claim 11, wherein said first set of baseband signal components are digital signals.

13. The apparatus of claim 11, wherein said set of baseband component values are in-phase and quadrature components of said received signal.

14. The apparatus of claim 11, wherein said known training sequence comprises L+N pilot values, and DC offset value estimation is performed according to the following equation:

$$\hat{m} = \frac{1}{N} \sum_{j=1}^{N} \tilde{y}_{j:TS}$$

where, $\tilde{y}_{j:TS}$ is a j:th vector of L+1 of the pilot symbols.

15. The apparatus of claim 11, wherein said bias DC offset value is determined according to the following equation:

$$R_{DC} = \frac{1}{N} \sum_{j=1}^{N} H^T U_{j:TS} = H^T \overline{U}_{TS}$$

where H is a channel model and U is a reference training sequence.

16. The apparatus of claim 11, further comprising:
   means for determining the location of at least one DC step value within said received baseband signal.

17. The apparatus of claim 16, wherein said means for determining further comprises:
   means for differentiating said baseband component values; and
   means for determining whether said differentiated baseband component values exceed a predetermined threshold value.

18. The apparatus of claim 16, further comprising:
   means for controlling the subtraction of said DC offset estimates from said received signal to ensure data synchronism between the estimated DC offset values and said set of baseband components.

19. The apparatus of claim 16, wherein if said DC step occurs within a training sequence of said transmitted sequence, the estimating step is performed independently over a part of the received message affected by DC step and over a part of the message not affected by the DC step.

20. The apparatus of claim 16, wherein if said DC step does not occur over a training sequence of said received burst, said DC offset value estimation over the DC step is performed according to the following equation:

$$\hat{m}_2 = \frac{1}{B - i_0 + 1} \sum_{k=i_0}^{B} \tilde{y}_k$$

where B is the amount of data and $i_0$ is the time of determined DC step.

* * * * *